United States Patent [19]

Davis

[11] 4,342,115
[45] Jul. 27, 1982

[54] LASER DISCHARGE ELECTRODE CONFIGURATION
[75] Inventor: Jack W. Davis, East Hartford, Conn.
[73] Assignee: United Technologies Corporation, Hartford, Conn.
[21] Appl. No.: 194,189
[22] Filed: Oct. 6, 1980
[51] Int. Cl.³ .............................................. H01S 3/09
[52] U.S. Cl. ...................................... 372/87; 372/69
[58] Field of Search ................... 331/94.5 PE, 94.5 D, 331/94.5 C, 94.5 G Primary Examiner—William L. Sikes
Assistant Examiner—Leon Scott, Jr.
Attorney, Agent, or Firm—Eric W. Petraske

[57] ABSTRACT

Discharge electrodes suitable for $CO_2$ and other electrically excited gas lasers are improved by the substitution of a single row of electrodes having an emissive area greater than the pin electrodes of the prior art and being spaced a greater distance upstream from the power electrodes.

8 Claims, 3 Drawing Figures

LASER DISCHARGE ELECTRODE CONFIGURATION

TECHNICAL FIELD

The invention relates to improved electrode configurations in an electrically excited gas laser.

BACKGROUND ART

U.S. Pat. No. 4,145,669, issued to Babcock et al on Mar. 20, 1979 shows a gaseous laser having an array of pin electrodes dispersed in rows spaced uniformly along the gas flow direction (FIG. 3 of that patent) and an improved configuration, modified by the substitution of a rod electrode for some of the downstream pin rows, (FIGS. 4, 5 and 6 of that patent).

Copending application U.S. Ser. No. 864,961, assigned to the assignee hereof and incorporated herein by reference shows similar electrode configurations and further teaches that a pin-rod electrode system produces the best discharge stability when there are two rows of pins followed by several rods.

DISCLOSURE OF INVENTION

An improved electrode configuration for an electrically excited gaseous laser comprises a single row of preionization electrodes of substantial emitting area followed by an array of uniformly spacer power electrodes, which single row is positioned upstream of the array by an amount substantially greater than the spacing of the power electrodes, thereby reducing the complexity of the ballast and improving discharge stability.

BEST MODE FOR CARRYING OUT THE INVENTION

Figure 1:
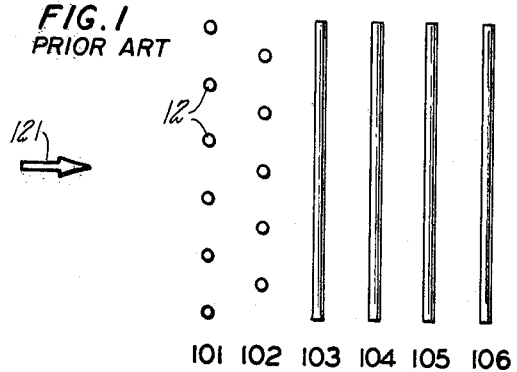
FIG. 1 shows an electrode array from the prior art.

FIG. 1 shows a top view of a prior-art, pin-rod electrode array for a $CO_2$ laser in which individually ballasted pins 12 are mounted in rows 101, 102 upstream of rods 103, 104, 105, 106 in gas flow 121. In this device, the spacing between pin row 102 and rod 103 is the same as the other streamwise electrode spacings in the array, typically in the range 0.4–1.0 inches, with lateral spacing pins of 0.4–0.7 inches for channel heights in the range of 1–3 inches, gas flow velocity 100–600 ft/sec, pressure 30–300 torr, pin ballast 10,000–50,000 ohms and discharge voltage 1,000–20,000 volts.

The electrode array of FIG. 1 is mounted on one side of a conventional transverse-discharge laser apparatus, having a plane electrode mounted on the other side of the discharge region from the pin-rod array and infrared transmissive windows forming the sides of a channel for gas flow 121. Suitable pumps, power supplies, etc., are all well known in the art and, forming no part of the subject invention, are omitted from the drawing.

An important consideration in the construction of high-power laser systems that employ multielement electrode arrays is that the electrical discharge that serves to pump the lasing gas be uniform across the dimensions of the lasing cavity—a distance that may be more than a meter. If the discharge is not uniform, the electric current tends to concentrate in a spark, terminating the lasing action. A highly uniform discharge will permit the extraction of more power from the laser before the discharge converts to an arc.

Figure 2:
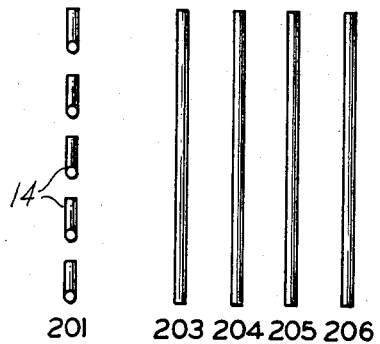
FIG. 2 shows an electrode array according to the invention.

According to the present invention, an embodiment of which is illustrated in FIG. 2, a single row 201 of short electrodes 14 is spaced upstream of an array of rods 203, 204, 205, 206. The rods are spaced streamwise as in the prior art but the spacing between row 201 and rod 203 is approximately twice that of the spacing between row 102 and rod 103 in the prior-art embodiment of FIG. 1. In the embodiment illustrated, electrodes 14 have a transverse length of approximately 0.5 inch and transverse spacing of 0.5 inch, giving half as many electrodes per row and are disposed in only one row, resulting in the use of one fourth as many ballast resistors as the prior art. Electrodes 14 in the form of small rods have been tested for different rod diameters in the range of 0.030 inch to 0.125 inch, and it has been found that discharge stability before arcing and rod temperature increase with decreasing rod diameter. Because excessive rod heating can cause the undesirable effects of reduced rod reliability and high local gas temperatures, a compromise is usually required. For lasers operating in the pressure range of 50 to 150 torr, segmented rod electrodes of 0.060 inch diameter are well suited. For lower pressures, larger-diameter rods are recommended, whereas for higher pressures, smaller-diameter rods can be used effectively. Various rod segment lengths up to two inches have been tested with longer segments having less discharge stability. Segments of approximately 0.6 inch in length have provided stability equivalent to that of the prior art array. As was noted above, discharge stability improves according to the present invention as the spacing between row 201 and rod 203 increases, up to a factor of two over the prior art, giving a spacing of 1.6 inches between row 201 and rod 203 and 0.8 inches between rods. Greater spacings have shown no significant improvement in discharge performance.

Figure 3:
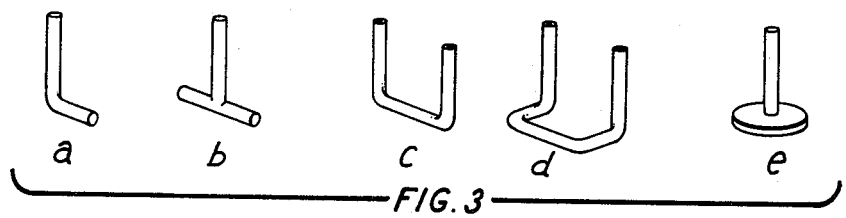
FIG. 3 shows variation individual electrode shapes.

Variations of electrode shape are shown in FIG. 3, the preferred embodiment for relatively low-power applications being the L-shaped embodiment of FIG. 3a, which is simple to fabricate by bending a rod, in comparison to the embodiment of FIG. 3b. For higher power applications, a hollow, U-shaped rod, such as those shown in FIGS. 3c and 3d, may be cooled more easily than a pin. If desired, an embodiment having a flat disk for the current emitting surface may be used, such as that shown in FIG. 3e.

Although this invention has been shown and described with respect to a preferred embodiment, it will be understood by those skilled in this art that various changes in form and detail thereof may be made without departing from the spirit and scope of the claimed invention.

I claim:
1. A laser electrode array for use in an electrically excited gas laser apparatus comprising:
(a) a plurality of electrodes disposed in a plane on one side of an excitation region through which said lasing gas flows along a flow axis substantially parallel to said plane;
(b) a single row of preionization electrodes having an emitting surface of substantial area and being disposed in said excitation region substantially parallel to said plane and substantially transverse to said flow axis;

(c) at least two power electrodes disposed in said excitation region, oriented parallel to said single row of preionization electrodes, the furthest upstream of said power electrodes being spaced downstream from said single row of preionization electrodes by a first distance and the remainder of said power electrodes being uniformly spaced apart by a second distance.

2. The electrode array according to claim 1, in which at least one of said preionization electrodes has an emitting surface along a rod element oriented substantially parallel to said plane.

3. The electrode array according to claim 1, in which said preionization electrodes have emitting surfaces along a rod element oriented substantially parallel to said plane.

4. The electrode array according to claims 1, 2 or 3 in which said first distance is substantially greater than said second distance.

5. The electrode array according to claim 4, in which said first distance is at least one and a half times as great as said second distance.

6. A laser electrode array for use in an electrically excited gas laser apparatus comprising:
(a) a plurality of electrodes disposed in a plane on one side of an excitation region through which said lasing gas flows along a flow axis substantially parallel to said plane;
(b) a single row of preionization electrodes having an emitting surface of substantial area and being disposed in said excitation region substantially parallel to said plane and substantially transverse to said flow axis;
(c) at least one power electrode disposed in said interaction region and having an upstream edge parallel to said single row of preioniztion electrodes, the furthest upstream of said upstream edges being spaced downstream from said single row of preionization electrodes by a first distance of at least eight tenths of an inch.

7. The electrode array according to claim 6, in which at least one of said preionization electrodes has an emitting surface along a rod element oriented substantially parallel to said plane.

8. The electrode array according to claim 7, in which said first distance is less than three inches.

* * * * *

UNITED STATES PATENT AND TRADEMARK OFFICE
CERTIFICATE OF CORRECTION

PATENT NO. : 4,342,115

DATED : July 27, 1982

INVENTOR(S) : Jack W. Davis

It is certified that error appears in the above-identified patent and that said Letters Patent are hereby corrected as shown below:

Column 1, line 28  "spacer" should read --spaced--

Column 1, line 38  "variation" should read --various--

Signed and Sealed this

Twelfth Day of October 1982

[SEAL]

Attest:

GERALD J. MOSSINGHOFF

Attesting Officer   Commissioner of Patents and Trademarks